(12) United States Patent
Kondoh et al.

(10) Patent No.: US 9,778,809 B2
(45) Date of Patent: Oct. 3, 2017

(54) COORDINATE DETECTION APPARATUS

(71) Applicant: FUJITSU COMPONENT LIMITED, Tokyo (JP)

(72) Inventors: Koichi Kondoh, Tokyo (JP); Shozo Furukawa, Tokyo (JP); Mitsuhiro Sekizawa, Tokyo (JP); Takashi Nakajima, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 65 days.

(21) Appl. No.: 14/960,600

(22) Filed: Dec. 7, 2015

(65) Prior Publication Data

US 2016/0085344 A1 Mar. 24, 2016

Related U.S. Application Data

(63) Continuation of application No. 12/425,430, filed on Apr. 17, 2009, now Pat. No. 9,256,337.

(30) Foreign Application Priority Data

Apr. 23, 2008 (JP) ................................ 2008-112957

(51) Int. Cl.
*G06F 3/045* (2006.01)
*G06F 3/047* (2006.01)

(52) U.S. Cl.
CPC .............. *G06F 3/045* (2013.01); *G06F 3/047* (2013.01); *G06F 2203/04103* (2013.01)

(58) Field of Classification Search
CPC . G06F 3/045; G06F 3/047; G06F 2203/04103
(Continued)

(56) References Cited

U.S. PATENT DOCUMENTS

| 4,745,242 A | 5/1988 | Koizumi et al. |
| 4,797,514 A | 1/1989 | Talmage, Jr. et al. |

(Continued)

FOREIGN PATENT DOCUMENTS

| CN | 1581370 | 2/2005 |
| JP | S62-184520 | 8/1987 |

(Continued)

OTHER PUBLICATIONS

Office Action dated Jul. 14, 2010 issued to the respect of the corresponding Chinese Patent Application 200910134590.6.

(Continued)

*Primary Examiner* — Mark Regn
(74) *Attorney, Agent, or Firm* — IPUSA, PLLC

(57) ABSTRACT

In a coordinate detection apparatus, a resistance-film is formed on a substrate made of an insulating material. A common electrode applies a voltage to the resistance-film, the common electrode extending along a plurality of a resistance-film removal areas formed by removing portions of the resistance-film. A voltage application part applies the voltage to the common electrode. The voltage is applied from the voltage application part to the resistance-film through the common electrode to generate a potential distribution in the resistance-film. A coordinate position of a contact position at which the resistance-film is contacted is detected by detecting a potential of the resistance-film at the contact position.

5 Claims, 13 Drawing Sheets

(58) Field of Classification Search
USPC .......................................................... 345/174
See application file for complete search history.

(56) References Cited

U.S. PATENT DOCUMENTS

| | | | | |
|---|---|---|---|---|
| 4,822,957 | A * | 4/1989 | Talmage, Jr. | G06F 3/045 178/18.05 |
| 6,163,313 | A * | 12/2000 | Aroyan | G06F 3/045 178/18.04 |
| 6,225,577 | B1 | 5/2001 | Sawai et al. | |
| 6,593,916 | B1 | 7/2003 | Aroyan | |
| 2002/0110944 | A1 | 8/2002 | Kian et al. | |
| 2004/0169643 | A1 | 9/2004 | Tseng | |
| 2007/0013678 | A1 * | 1/2007 | Nakajima | G06F 3/045 345/174 |

FOREIGN PATENT DOCUMENTS

| | | |
|---|---|---|
| JP | H01-120242 U | 8/1989 |
| JP | 2595246 | 4/1997 |
| JP | H10-083251 | 3/1998 |
| JP | 2001-125724 | 5/2001 |
| JP | 2007-025904 | 2/2007 |
| KR | 10-0649913 | 11/2006 |
| WO | 2007001155 | 1/2007 |

OTHER PUBLICATIONS

Office Action dated Oct. 26, 2010 issued to the respect of the corresponding Korean Patent Application 10-2009-0034533.
Office Action dated Jan. 31, 2012 issued to the respect of basic Japanese Patent Application 2008-112957.

* cited by examiner

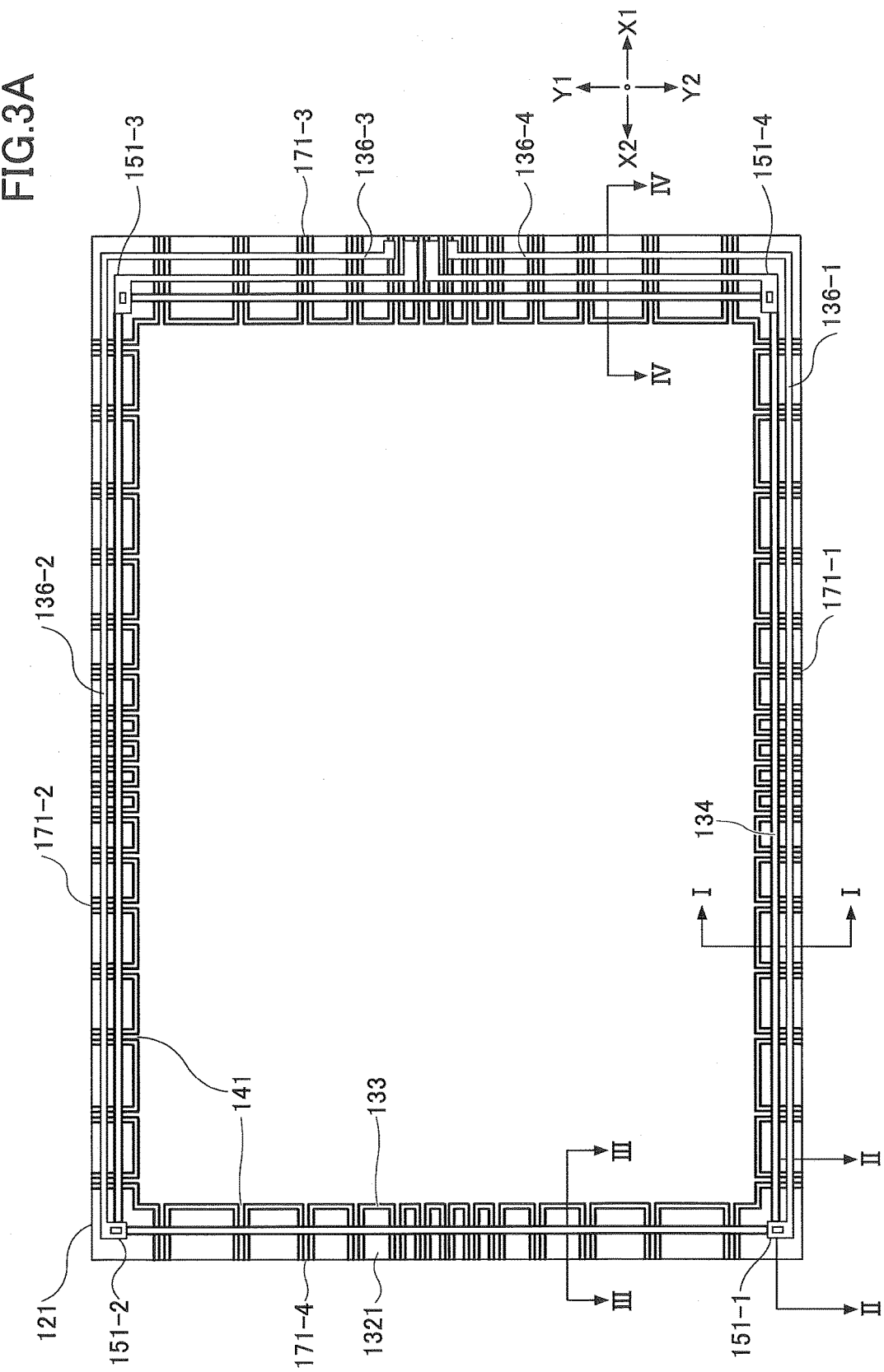

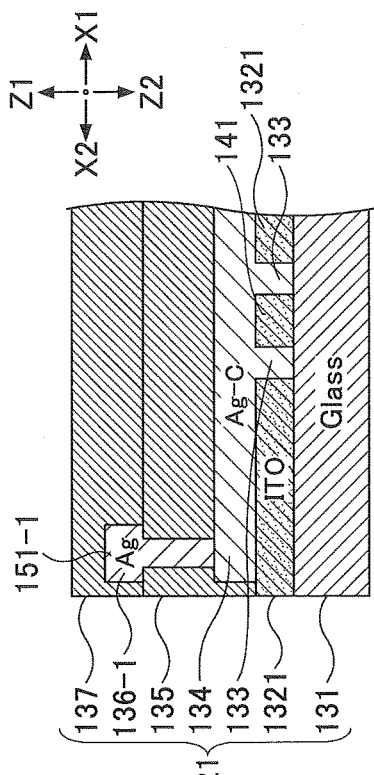
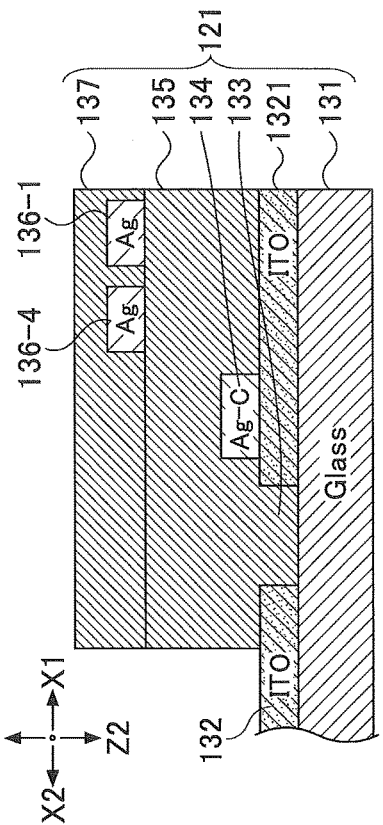
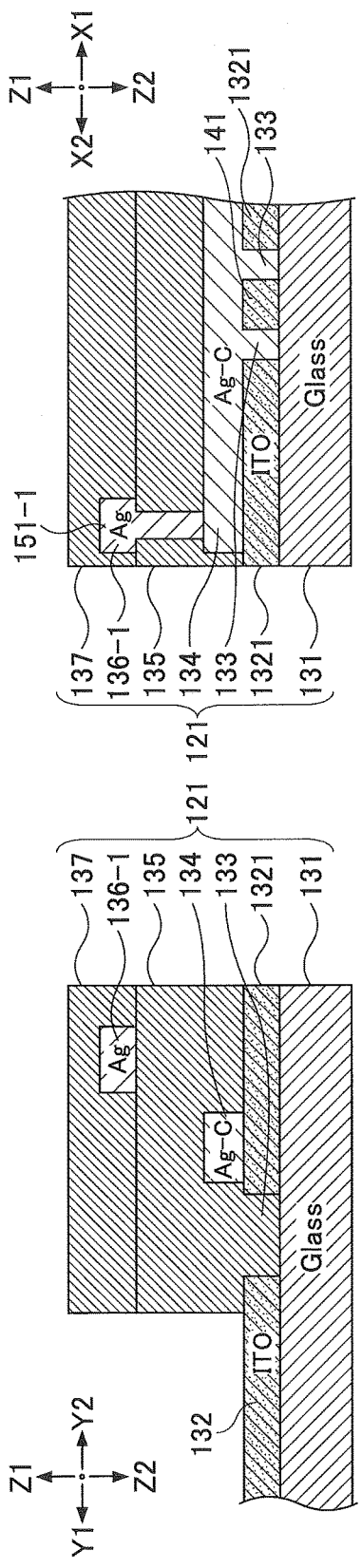
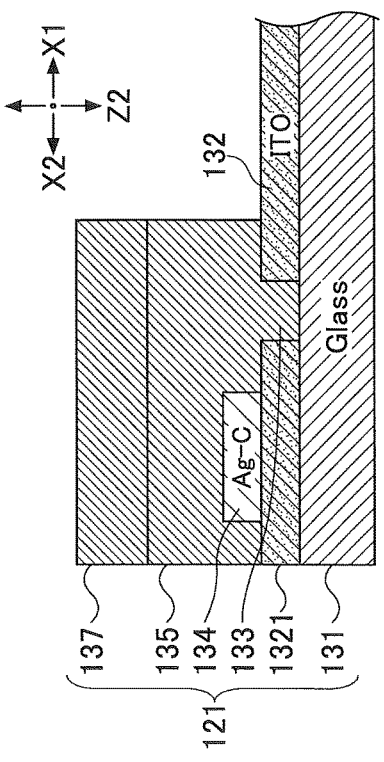

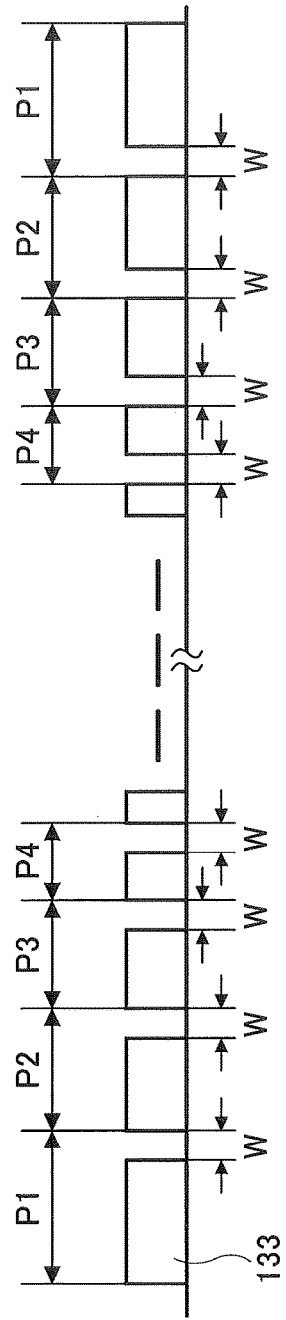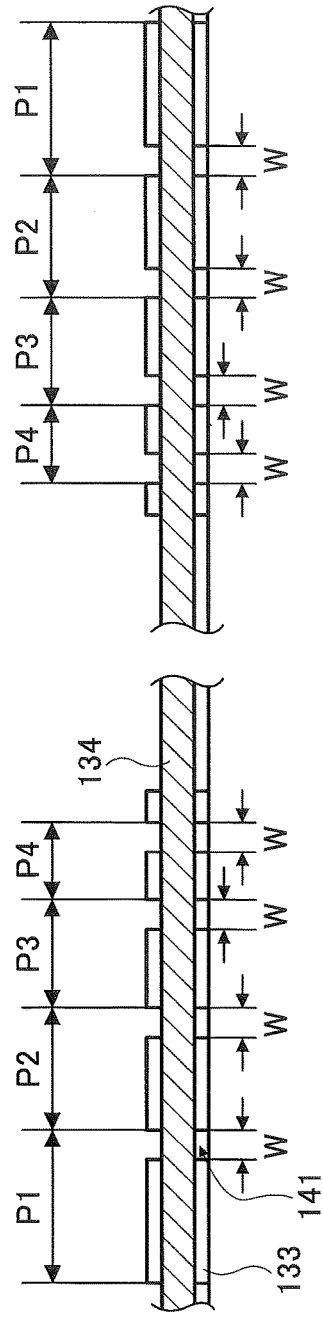

FIG.7A
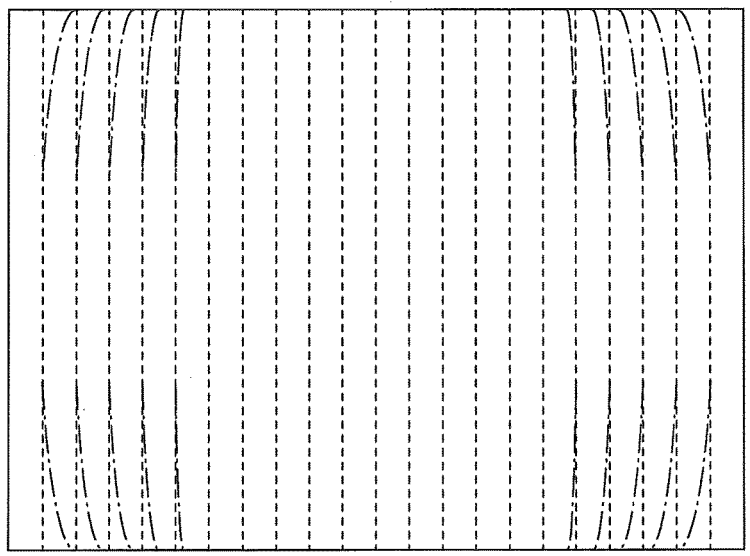
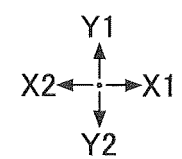
FIG.7B
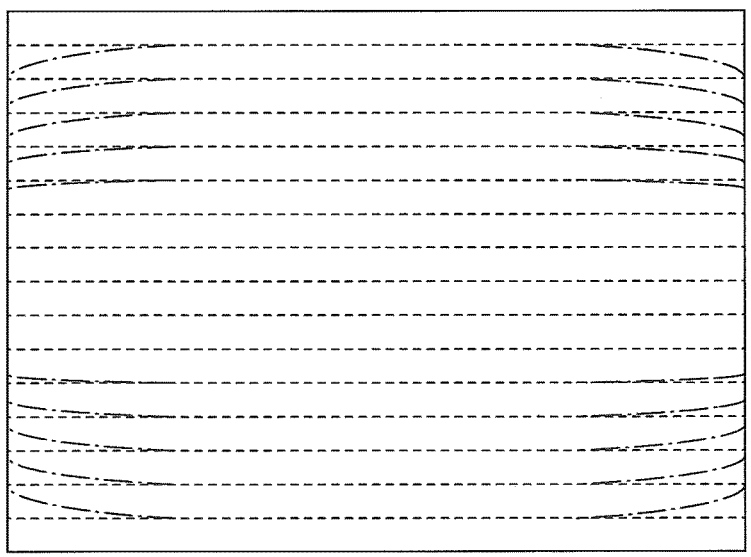
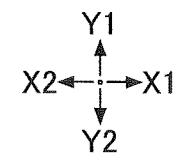

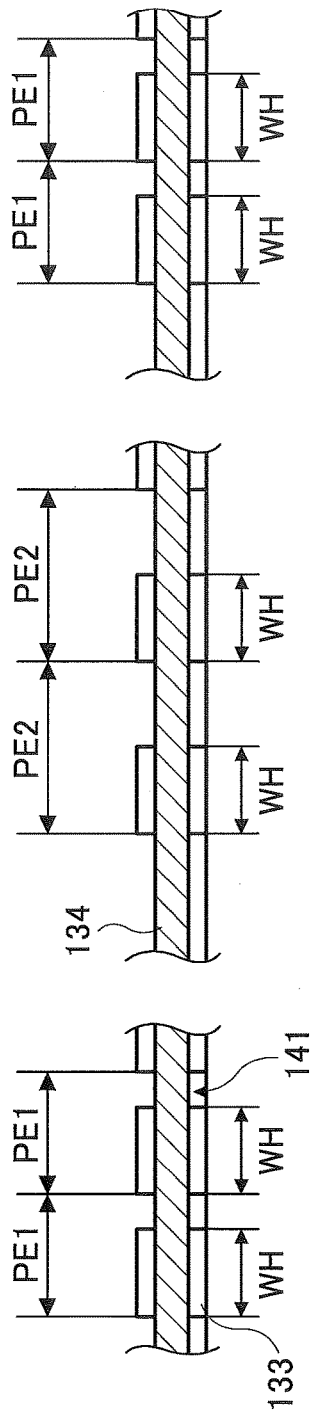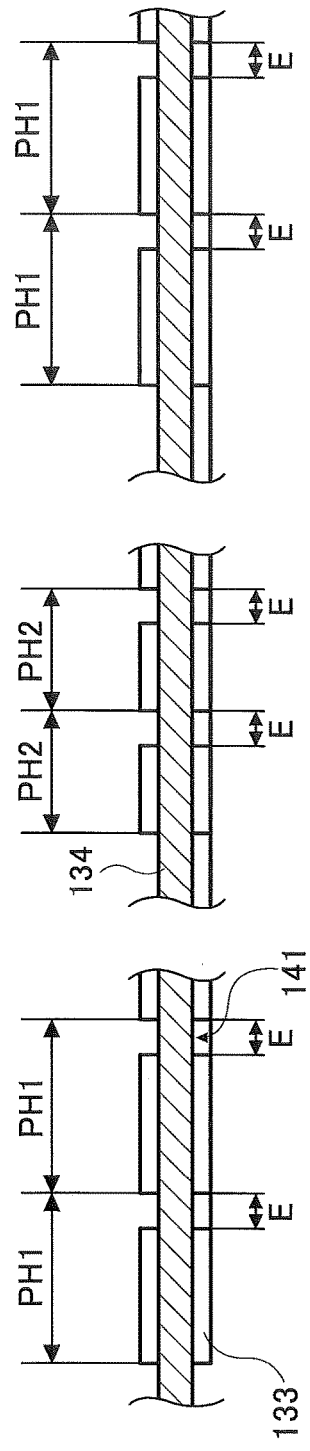
FIG.8A
FIG.8B

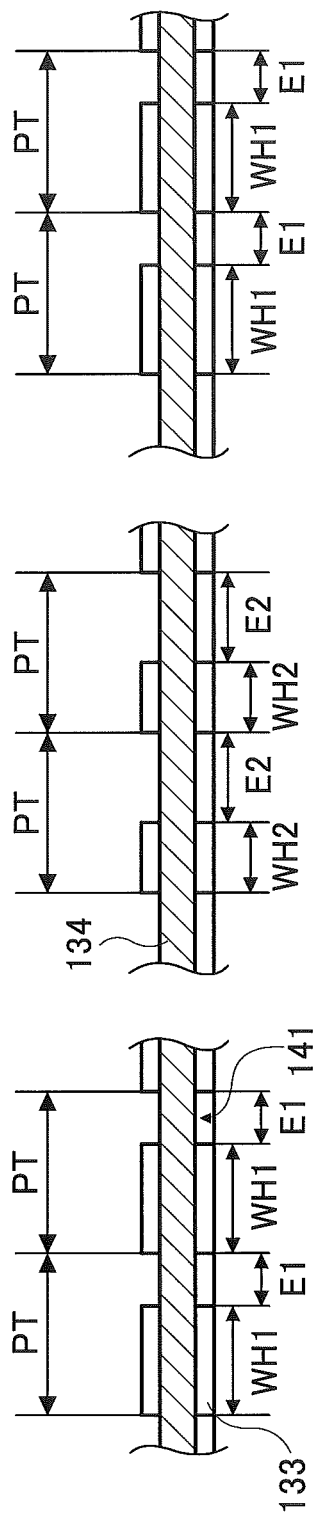

COORDINATE DETECTION APPARATUS

CROSS-REFERENCE TO RELATED APPLICATIONS

This application is a continuation application filed under 35 U.S.C. 111(a) claiming the benefit under 35 U.S.C. 120 of U.S. patent application Ser. No. 12/425,430 filed on Apr. 17, 2009, which is based upon and claims the benefit of priority of the prior Japanese Patent Application No. 2008-112957, filed on Apr. 23, 2008, the entire contents of which are incorporated herein by reference.

FIELD

The embodiment discussed herein is directed to a coordinate detection apparatus for detecting coordinates of an input position.

BACKGROUND

A touch panel is used in many cases as an input device of a computer system. The touch panel is mounted on a display to detect a coordinate position on the display and acquire a detection signal corresponding to the detected coordinate position. The touch panel permits a simple and intuitive direct input of a coordinate position.

There are various types of touch panels, such as a resistance-film type, an optical type, a capacity-coupling type, etc. Among those types, a resistance-film touch panel is used in many cases because the resistance-film touch panel has a simple structure and a simple control system.

The resistance-film touch panel includes a low resistance type, which is classified into a four-wire system, a five-wire system, an eight-wire system, etc. Unlike a resistance-film touch panel using the four-wire system or the eight-wire system, a resistance-film touch panel using the five-wire system (hereinafter, referred to as "five-wire resistance-film touch panel) has a conductive film of an upper board arranged on an operation face side, which conductive film is exclusively used for reading a potential. Accordingly, five-wire resistance-film touch panel does not have a problem of an edge slide, which is a disadvantage in other systems such as the four-wire system and the eight-wire system. Thus, the five-wire resistance-film touch panel can be used in an application, which requires use in a severe environment and a long service life.

FIG. 1 illustrates a structure of the five-wire resistance-film touch panel. The five-wire resistance-film touch panel 1 includes an upper board 11 and a lower board 12. A transparent resistance-film 22 is formed on an entire surface of a glass substrate 21 of the lower board 12. X-coordinate detection electrodes 23 and 24 and Y-coordinate detection electrodes 25 and 26 are formed on the transparent resistance-film 22. On the other hand, a transparent resistance-film 32 is formed on a film substrate 31 of the upper board 11, and a coordinate detection electrode 33 is formed on the transparent resistance-film 32.

First, a voltage is applied to the X-coordinate detection electrodes 23 and 24, which results in a potential distribution generated in an X-coordinate direction in the transparent resistance-film 22 of the lower board 12. Accordingly, the X-coordinate of a position where a portion of the upper board 11 is in contact with the lower board 12 can be detected by detecting a potential on the transparent resistance-film 22 of the lower board 12. Then, a voltage is applied to the Y-coordinate detection electrodes 25 and 26, which results in a potential distribution generated in a Y-coordinate direction in the transparent resistance-film 22 of the lower board 12. Accordingly, the Y-coordinate of the position where the portion of the upper board 11 is in contact with the lower board 12 can be detected by detecting a potential on the transparent resistance-film 22 of the lower board 12.

It is an issue for the above mentioned touch panel as to how to generate a uniform potential distribution in the transparent resistance-film 22 of the lower board 12. In order to make uniform the potential distribution in the transparent resistance-film 22 of the lower board 12, there is suggested a plurality of potential distribution correction patterns being arranged on a periphery of the lower board 12 (for example, refer to Patent Document 1). Additionally, there is suggested a common electrode being arranged to surround an input surface (for example, refer to Patent Document 2). Further, there is suggested an opening part being formed in an insulation film provided on a transparent resistance-film to apply a potential through a portion where the opening parts is formed (for example, refer to Patent Document 3).

Patent Document 1: Japanese Laid-Open Patent Application No. 10-83251

Patent Document 2: Japanese Laid-Open Patent Application No. 2001-125724

Patent Document 3: Japanese Laid-Open Patent Application No. 2007-25904

A coordinate input device is required to be smaller in an outer frame configuration due to miniaturization of an apparatus into which a coordinate input device is incorporated. However, it is difficult to reduce an outer frame size of a conventional coordinate input device because a plurality of potential distribution patterns must be arranged on a periphery of the coordinate input device.

The method of providing a common electrode, which is arranged to surround an input surface, has a problem in that a potential distribution of a transparent resistance-film becomes uneven if a resistance ratio of a resistance of the transparent resistance-film and a resistance of a pattern resistor is not sufficiently large.

The method of providing an opening part in an insulation film may solve the above-mentioned problems, but a manufacturing process becomes complex and, especially, variation in resistance values due to variation in materials and manufacturing process may deteriorate a product performance, which reduces a yield rate.

SUMMARY

It is a general object to provide a coordinate detection apparatus in which the above-mentioned problems are eliminated.

A more specific object of the present invention is to provide a coordinate detection apparatus having a reduced frame size and capable of detecting a coordinate position with improved detection accuracy.

According to an aspect of the invention, a coordinate detection apparatus includes: a resistance-film formed on a substrate made of an insulating material; a common electrode configured to apply a voltage to the resistance-film, the common electrode extending along a plurality of a resistance-film removal areas formed by removing portions of the resistance-film; and a voltage application part configured to apply the voltage to the common electrode, wherein the voltage is applied from the voltage application part to the resistance-film through the common electrode to generate a potential distribution in the resistance-film; and wherein a coordinate position of a contact position at which the resistance-film is contacted is detected by detecting a potential of the resistance-film at the contact position.

According to the above-mentioned invention, the potential distribution generated in the resistance-film by applying a voltage can be made uniform, and, thereby an accurate coordinate detection can be achieved.

The object and advantages of the embodiment will be realized and attained by means of the elements and combinations particularly pointed out in the appended claims.

It is to be understood that both the foregoing general description and the following detailed description are exemplary explanations only and are not restrictive of the invention, as claimed.

BRIEF DESCRIPTION OF DRAWINGS

FIG. 3A is a plan view of a lower board illustrated in FIG. 2;

FIG. 3B is a cross-sectional view taken along a line I-I of FIG. 3A;

FIG. 3C is a cross-sectional view taken along a line II-II of FIG. 3A;

FIG. 3D is a cross-sectional view taken along a line III-III of FIG. 3A;

FIG. 3E is a cross-sectional view taken along a line IV-IV of FIG. 3A;

FIG. 4A is an illustration for explaining pitches of resistance-film removal areas;

FIG. 4B is an illustration for explaining pitches of resistance-film removal areas;

FIG. 7A is an illustration indicating a potential distribution in X-coordinate detection in a lower board illustrated in FIG. 2;

FIG. 7B is an illustration indicating a potential distribution in Y-coordinate detection in the lower board illustrated in FIG. 2;

FIG. 8A is a plan view of a first example of resistance-film removal areas and common electrode;

FIG. 8B is a plan view of a second example of the resistance-film removal areas and the common electrode;

FIG. 8C is a plan view of a third example of the resistance-film removal areas and the common electrode;

DESCRIPTION OF EMBODIMENT(S)

Preferred embodiments of the present invention will be explained with reference to the accompanying drawings.

First Embodiment

Figure 1:
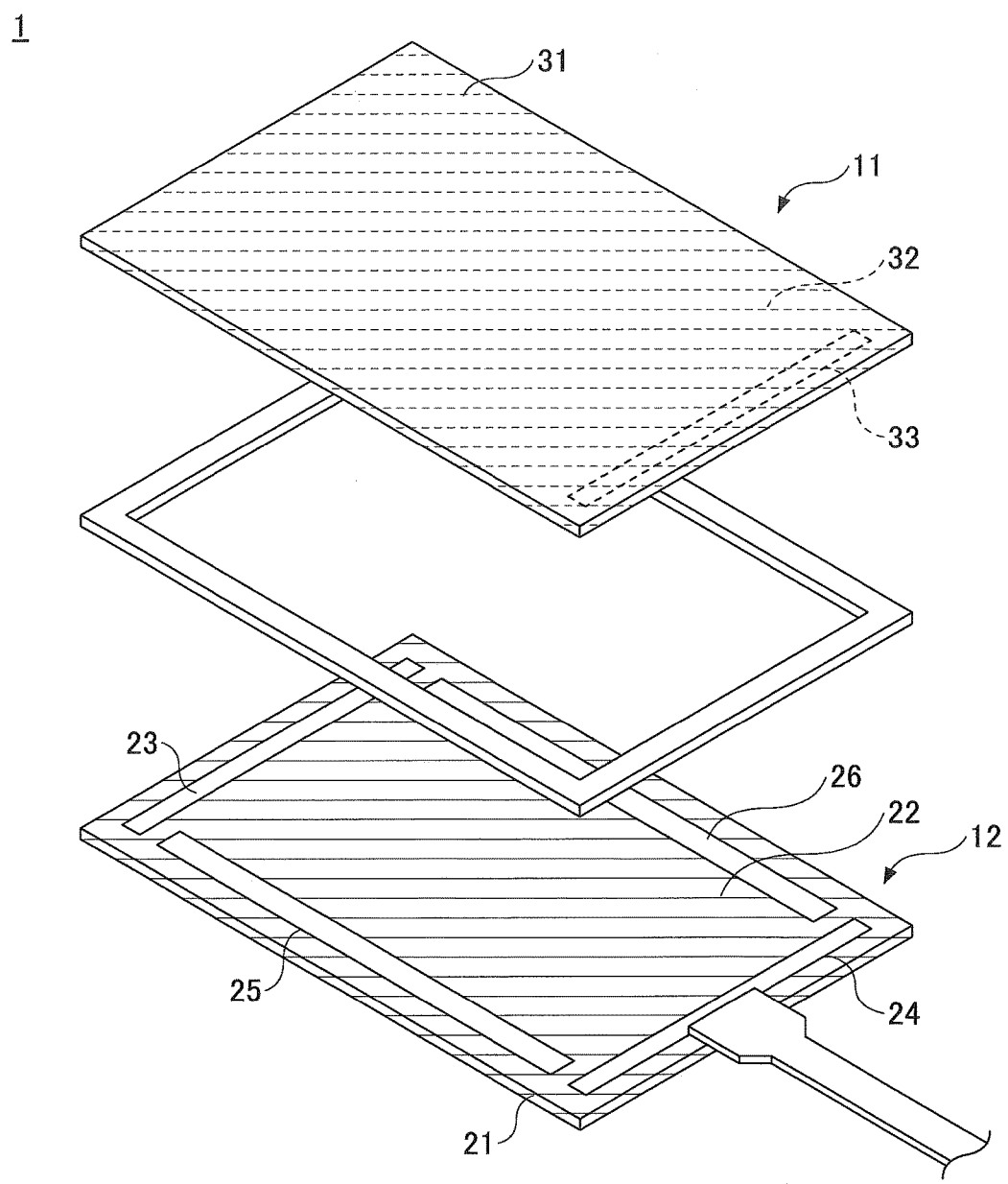
FIG. 1 is an exploded perspective view of a five-wire resistance-film touch panel.
Figure 2:
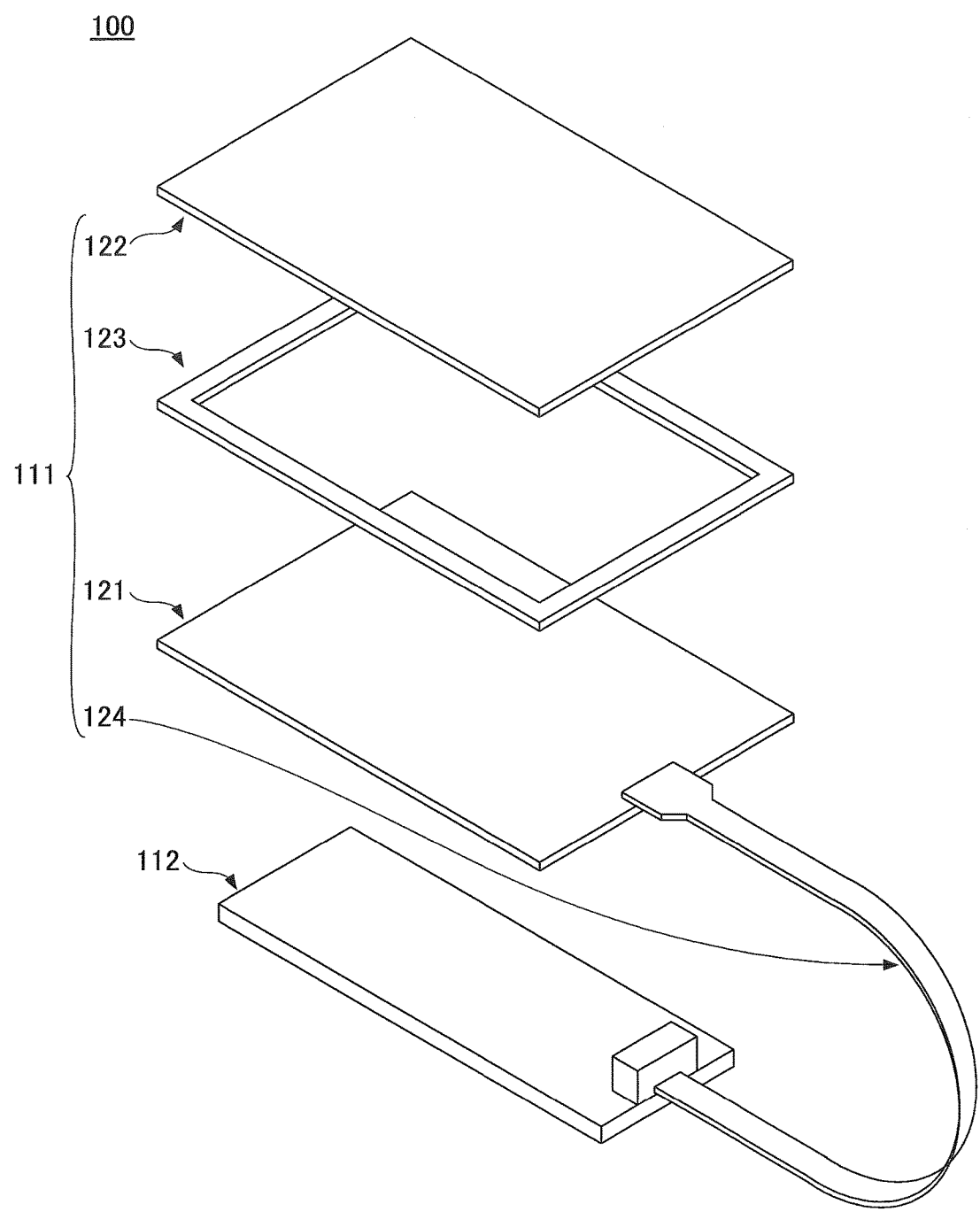
FIG. 2 is an exploded perspective view of a coordinate detection device according to a first embodiment of the present invention.

A description will be given of a first embodiment of the present invention. FIG. 2 is an exploded perspective view of a coordinate detection device according to a first embodiment of the present invention. The coordinate detection device illustrated in FIG. 2 is a coordinate input system 100 having a touch panel of a five-wire analog resistance-film type. The coordinate input system 100 of the present embodiment includes a panel part 111 and an interface board 112.

The panel part 111 includes a lower board 121, an upper board 122, a spacer 123, and an FPC cable 124. The lower board 121 and the upper board 122 are joined together via the spacer 123. The spacer 123 is made of, for example, an insulating double-sided adhesion tape to join the lower board 121 and the upper board 122 with a predetermined gap therebetween. The FPC cable 124 has a structure in which first through fifth wires are formed on a flexible printed circuit board. The FPC cable 124 is connected to the lower board 121 by thermal compression bonding an anisotropic conductive film to the lower board 121.

A description is given below of the lower board 121. FIG. 3A is a plan view of the lower board 121 where a first insulation film 135 and a second insulation film 137 are omitted for simplicity. FIG. 3B is a cross-sectional view taken along a line I-I of FIG. 3A. FIG. 3C is a cross-sectional view taken along a line II-II of FIG. 3A. FIG. 3D is a cross-sectional view taken along a line III-III of FIG. 3A. FIG. 3E is a cross-sectional view taken along a line IV-IV of FIG. 3A. In FIGS. 3B to 3E, the first insulation film 135 and the second insulation film 137 are illustrated.

The lower board 121 includes a glass substrate 131, a transparent resistance-film 132, a resistance-film removal area 133, a common electrode 134, a first insulation film 135, a wire 136, and a second insulation film 137. The transparent resistance-film 132 is formed over a substantially entire surface of the glass substrate 131. The transparent resistance-film 132 is formed of, for example, ITO (indium tin oxide) deposited by a vacuum vapor deposition method. The transparent resistance-film 132 has a predetermined resistance and transmits a light in a visible light range. In the present embodiment, an entire portion of the transparent resistance-film 132 in the resistance-film removal area 133 is not removed. An electrical insulation is made between a portion 1321 of the transparent resistance-film 132 encompassed by the resistance-film removal area 133 and a portion of the transparent resistance-film 132 outside the resistance-film removal area 133. By electrically insulating the portion 1321 of the transparent resistance film 132 encompassed by the resistance-film removal area 133 from the portion of the transparent resistance-film 132 outside the resistance-film removal area 133, the same effect as that obtained in a case where an entire portion of the transparent resistance-film 132 in the resistance film removal area 133 is removed can be obtained, thereby improving a throughput because an amount of the transparent resistance-film 132 to be removed is small.

The resistance-film removal areas 133 are provided in a marginal area of the glass substrate 131, where the common electrode 134 is formed. Specifically, the common electrode 134 is formed on the transparent resistance-film 132 in which the resistance-film removal areas 133 are formed. Thus, the transparent resistance-film 132 and the common electrode 134 between the adjacent resistance-film removal areas 133 are connected to each other, thereby forming potential supply parts 141. In the present embodiment, the intervals W between the adjacent resistance-film removal areas 133 are equal to each other as illustrated in FIG. 4A. That is, the potential supply parts 141 have the same width as mentioned later. The pitches of the resistance-film removal areas 133 near the opposite ends of each of a first side 171-1, a second side 171-2, a third side 171-3 and a fourth side 171-4 are large, and the pitches are gradually reduced toward the center of each of the first side 171-1, the second side 171-2, the third side 171-3 and the fourth side 171-4. Specifically, the pitches P1, P2, P3, P4, . . . are gradually reduced (P1>P2>P3>P4 . . . ) from the opposite ends to the center of each side.

The potential supply parts 141 are formed in the contact areas of the transparent resistance-film 132 and the common electrode 134 between the adjacent resistance-film removal areas 133. In the present embodiment, as illustrated in FIG. 4B, the potential supply parts 141 are formed with large pitches near the opposite ends of each of the first through fourth sides 171-1, 171-2, 171-3 and 171-4, and are formed with small pitches in the middle part thereof. According to the above-mentioned structure of the potential supply parts 141, a distortion in the potential distribution at each of the first side 171-1, the second side 171-2, the third side 171-3 and the fourth side 171-4 is suppressed, which enables making uniform the potential distribution in the transparent resistance-film 132. Thus, accurate coordinate position detection can be achieved.

The configuration of the potential supply parts 141 is not limited to that illustrated in FIG. 4B, and any configuration may be used in which portions of the transparent resistance-film 132 are removed so that the contact areas between the transparent resistance-film 132 and the common electrode 134 are narrow near the opposite ends of each of the first through fourth sides 171-1, 171-2, 171-3 and 171-4 and wider in the middle thereof.

The common electrode 134 is made of, for example, Ag—C and formed in the resistance-film removal areas 133 and between the resistance-film removal areas 133.

The first insulation film 135 is formed in the resistance-film removal areas 133 to cover the common electrode 134. Four penetrating holes 151-1 through 151-4 are formed at the four corners of the lower board 121, respectively. The penetrating holes 151-1 through 151-4 constitute a drive voltage application part.

A first wire 136-1 is made of a low-resistance material such as Ag, and is formed on the first insulation film 135 along the first side 171-1 of the lower board 121. The first wire 136-1 is formed to fill up the first penetrating hole 151-1 and is connected to a first wire of the FPC cable 124.

A second wire 136-2 is made of a low-resistance material such as Ag, and is formed on the first insulation film 135 along the second side 171-2 opposite to the first side 171-1 of the lower board 121. The second wire 136-2 is formed to fill up the second penetrating hole 151-2 and is connected to a second wire of the FPC cable 124.

A third wire 136-3 is made of a low-resistance material such as Ag, and is formed on the first insulation film 135 along a half of the third side 171-3 perpendicular to the first and second sides 171-1 and 171-2 of the lower board 121 on the side of the second side 171-2. The third wire 136-3 is formed to fill up the third penetrating hole 151-3 and is connected to a third wire of the FPC cable 124.

A fourth wire 136-4 is made of a low-resistance material such as Ag, and is formed on the first insulation film 135 along a half of the third side 171-3 perpendicular to the first and second sides 171-1 and 171-2 of the lower board 121 on the side of the first side 171-1. The fourth wire 136-4 is formed to fill up the fourth penetrating hole 151-4 and is connected to a fourth wire of the FPC cable 124.

The second insulation film 137 is formed on the first insulation film 135 to cover the first wire 136-1, the second wire 136-2, the third wire 136-3 and the fourth wire 136-4. The upper board 122 is joined to the second insulation film 137 via the spacer 123.

Figure 5A:
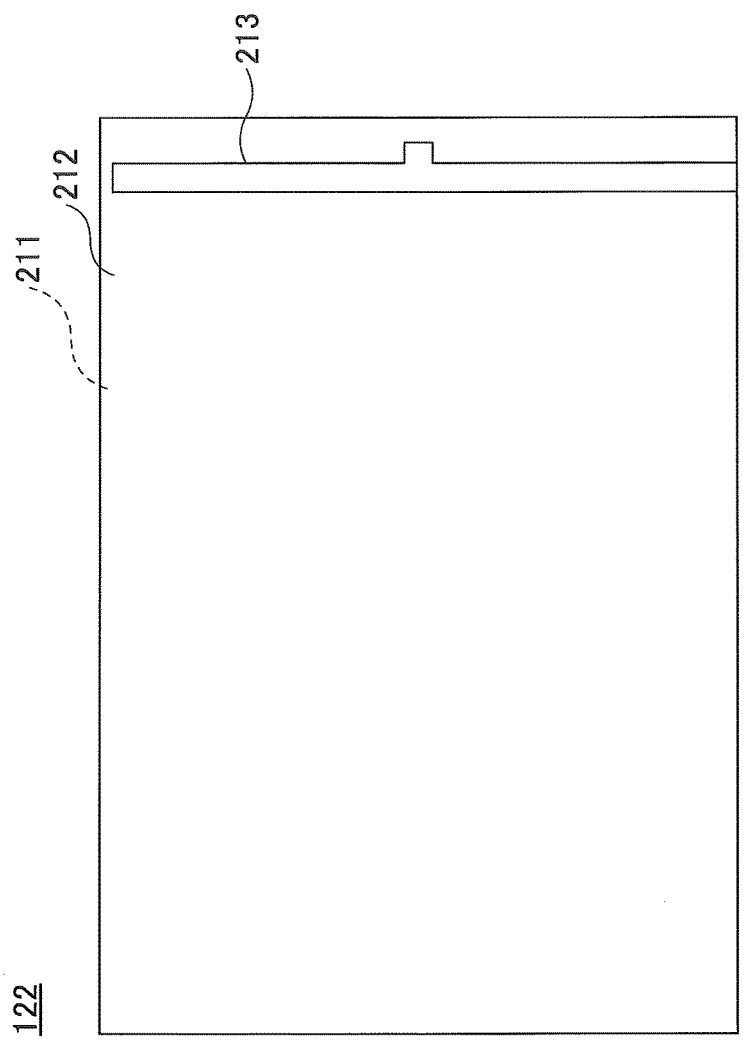
FIG. 5A is a plan view of an upper board illustrated in FIG. 2.
Figure 5B:
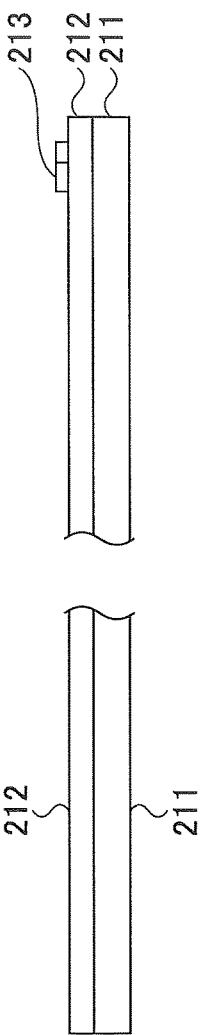
FIG. 5B is a side view of the upper board illustrated in FIG. 2.

Next, a description will be given, with reference to FIGS. 5A and 5B, of a configuration of the upper electrode 122. The upper board 122 includes a film board 211, a transparent resistance-film 212, and an electrode 213. The film board 211 is made of a flexible resin film such as a PET film or the like. The transparent resistance-film 212 is formed on an entire surface of the film board 211 facing the lower board 121. The transparent resistance-film 212 is made of a transparent conductive material such as ITO. The electrode 213 is arranged at an end portion of the upper board 122 in the X1-direction on the transparent resistance-film 212, and is connected to a fifth wire of the FPC cable 124, which is connected to the lower board 121 through a contact (not illustrated in the figure). A coordinate position can be detected by detecting a potential of the lower board 121 by the interface board 112 using the upper board 122 as a probe.

A description will be given below of a procedure of detecting a coordinate position in the coordinate detection apparatus according to the present embodiment.

Figure 6:
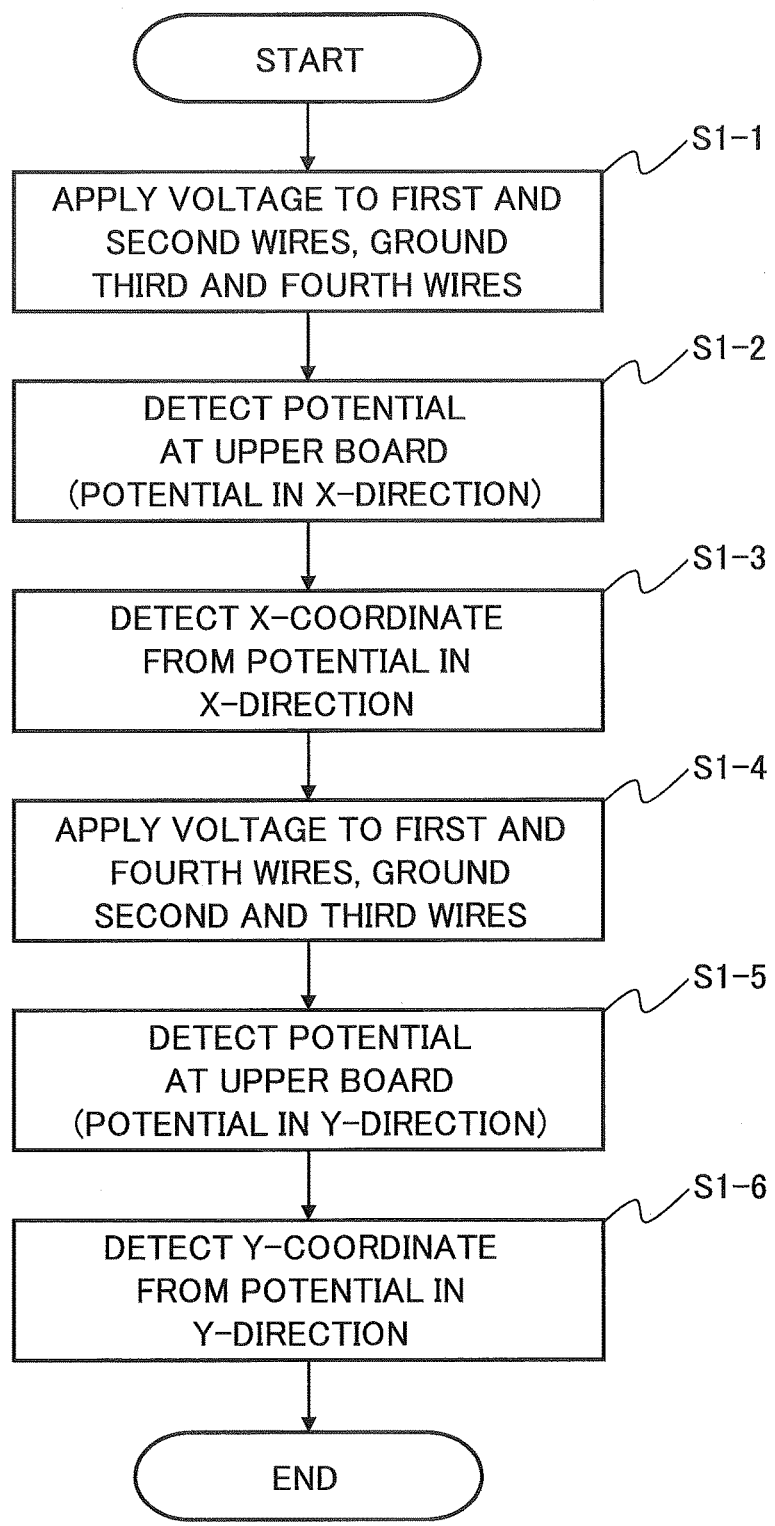
FIG. 6 is a flowchart of a process performed by an interface board illustrated in FIG. 2.

FIG. 6 is a flowchart of a process performed by the interface board 112. FIGS. 7A and 7B are illustrations indicating a potential distribution in the lower board 121. FIG. 7A indicates a potential distribution in X-coordinate detection. FIG. 7B indicates a potential distribution in Y-coordinate detection.

The interface board 112 applies, in step S1-1, a voltage Vx to the first wire 136-1 and the second wire 136-2, and grounds the third wire 136-3 and the fourth wire 136-4. Thereby, a uniform potential distribution indicated by dotted lines in FIG. 7A is generated in the transparent resistance-film 132. It should be noted that a potential distribution generated in a conventional apparatus is distorted as indicted by single-dashed chain lines in FIG. 7A. Comparing the potential distribution generated in coordinate detection apparatus according to the present embodiment and the potential distribution generated in a conventional apparatus, it can be appreciated that an accurate X-coordinate detection can be achieved in the coordinate detection apparatus according to the present embodiment.

Then, the interface board 112 detects, in step S1-2, a potential of the lower board 121, and detects, in step S1-3, X-coordinates in response to the potential of the lower board 121.

Then, the interface board 112 applies, in step S1-4, a voltage Vy to the first wire 136-1 and the 4th wire 136-4, and grounds the second wire 136-2 and the third wire 136-3. Thereby, a uniform potential distribution indicated by dotted lines in FIG. 7B is generated in the transparent resistance-film 132. It should be noted that a potential distribution generated in a conventional apparatus is distorted as indicted by single-dashed chain lines in FIG. 7B. Comparing the potential distribution generated in coordinate detection apparatus according to the present embodiment and the potential distribution generated in a conventional apparatus, it can be appreciated that an accurate Y-coordinate detection can be achieved in the coordinate detection apparatus according to the present embodiment.

Then, the interface board 112 detects, in step S1-5, a potential of the lower board 121, and detects, in step S1-6, X-coordinates in response to the potential of the lower board 121.

According to the present embodiment, because the first through fourth wires 136-1, 136-2, 136-3 and 136-4 are laminated on the common electrode 134, the outer size of the panel part 121 is reduced, which results in miniaturization of the coordinate detection apparatus. Additionally, because the potential distribution generated in the transparent resistance-film 132 of the lower board 121 by applying voltages by the potential supply parts 141 can be made uniform in the detection area, an accurate coordinate detection can be achieved.

Although the five-wire resistance-film analog touch panel is explained in the above-mentioned embodiment, the present invention is not limited to the five-wire resistance-film analog touch panel and is applicable to other touch panels such as a four-wire resistance-film touch panel, a seven-wire resistance-film touch panel, etc.

Second Embodiment

A description will be given below of a coordinate detection apparatus according to a second embodiment of the present invention. In the second embodiment, the pattern of the resistance-film removal areas 133 and the pattern of the potential supply parts 141 are different from that of the first embodiment. Additionally, in the second embodiment, the resistance-film removal areas 133 and the common electrode 134 do not overlap with each other.

FIG. 8A is a plan view of a first example of the resistance-film removal areas 133 and the common electrode 134. In FIG. 8A, the resistance-film removal areas 133 are in the same shape, and have the same width WH. The resistance-film removal areas 133 are formed with a small pitch PE1 near the opposite ends of each of the first side 171-1, the second side 171-2, the third side 171-3 and the fourth side 171-4, and with a large pitch PE2 in the middle portion of each side. Thus, by forming the common electrode 134 on the transparent resistance-film 132 where the resistance-film removal areas 133 are formed, the potential supply parts 141 can be formed so that the area of contacting the transparent resistance-film 132 with the common electrode 134 is small near the opposite ends of each side and is large in the middle portion of each side. Accordingly, a distortion in the potential distribution near the opposite ends of each of the first side 171-1, the second side 171-2, the third side 171-3 and the fourth side 171-4 of the panel part 121 can be suppressed, which makes uniform the potential distribution in the transparent resistance-film 132. Thus, an accurate coordinate detection can be achieved.

FIG. 8B is a plan view of a second example of the resistance-film removal areas 133 and the common electrode 134. In FIG. 8B, the resistance-film removal areas 133 are formed so that the potential supply parts 141 have the same width E. In order to form the potential supply parts 141 with the same width E, the resistance-film removal areas 133 are formed with a large pitch PH1 near the opposite ends of each of the first side 171-1, the second side 171-2, the third side 171-3 and the fourth side 171-4, and with a small pitch PH2 in the middle portion of each side. Thus, by forming the common electrode 134 on the transparent resistance-film 132 where the resistance-film removal areas 133 are formed, the potential supply parts 141 can be formed so that the areas of the potential supply parts 141 formed by the transparent resistance-film 132 and the common electrode 134 are the same but the potential supply parts 141 are arranged sparsely near the opposite ends of each side and arranged densely in the middle portion of each side. Accordingly, a distortion in the potential distribution near the opposite ends of each of the first side 171-1, the second side 171-2, the third side 171-3 and the fourth side 171-4 of the panel part 121 can be suppressed, which makes uniform the potential distribution in the transparent resistance-film 132. Thus, an accurate coordinate detection can be achieved.

FIG. 8C is a plan view of a third example of the resistance-film removal areas 133 and the common electrode 134. In FIG. 8C, the resistance-film removal areas 133 are formed with the same pitch PT, and the resistance-film removal areas 133 are formed with a large width WH1 near the opposite ends of each of the first side 171-1, the second side 171-2, the third side 171-3 and the fourth side 171-4 of the panel part 121, and with a small width WH2 in the middle portion of each side. Thus, by forming the common electrode 134 on the transparent resistance-film 132 where the resistance-film removal areas 133 are thus-formed, the width E2 of the potential supply parts 141, which are formed by the transparent resistance-film 132 and the common electrode 134, near the opposite ends of each side of the panel part 121 are small, and a width E2 of the potential supply parts 141 in the middle portion of each side is large. Accordingly, the area of the potential supply parts 141 near the opposite ends of each side of the panel part 121 is small, and the area of the potential supply parts 141 in the middle portion of each side is large. Accordingly, a distortion in the potential distribution near the opposite ends of each of the first side 171-1, the second side 171-2, the third side 171-3 and the fourth side 171-4 of the panel part 121 can be suppressed, which makes uniform the potential distribution in the transparent resistance-film 132. Thus, an accurate coordinate detection can be achieved.

Figure 9A:
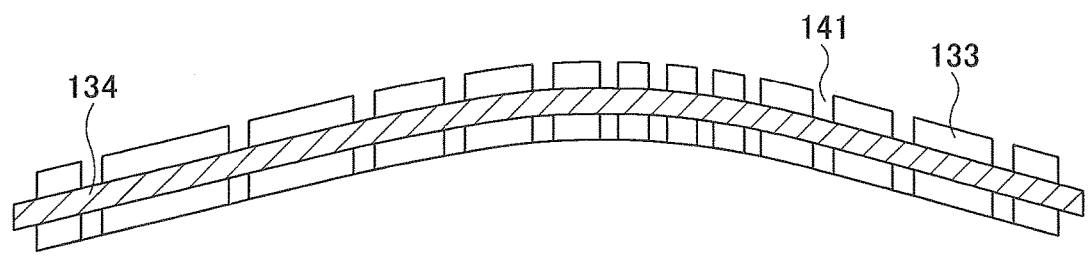
FIG. 9A is a plan view of a fourth example of the resistance-film removal areas and the common electrode.

FIG. 9A is a plan view of a fourth example of the resistance-film removal areas 133 and the common electrode 134. In FIG. 9A, a line along which the resistance-film removal areas 133 and the potential supply parts 141 are arranged is curved inwardly at each of the first side 171-1, the second side 171-2, the third side 171-3 and the fourth side 171-4 of the panel part 121. That is, the resistance-film removal areas 133 and the potential supply parts 141 near the opposite ends of each side are apart away from the center of the panel part 12, and the resistance-film removal areas 133 and the potential supply parts 141 in the middle portion of each side are closer to the center of the panel part 12. Accordingly, a distortion in the potential distribution near the opposite ends of each of the first side 171-1, the second side 171-2, the third side 171-3 and the fourth side 171-4 of the panel part 121 can be suppressed, which makes uniform the potential distribution in the transparent resistance-film 132. Thus, an accurate coordinate detection can be achieved.

Figure 9B:
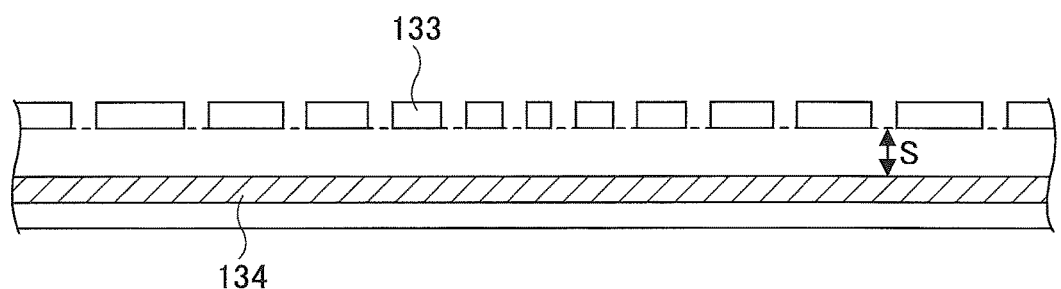
FIG. 9B is a plan view of a fifth example of the resistance-film removal areas and the common electrode.

FIG. 9B is a plan view of a fifth example of the resistance-film removal areas 133 and the common electrode 134. In FIG. 9B, the resistance-film removal areas 133 do not overlap with the common electrode 134. The pattern of the resistance-film removal areas 133 can be any of the patterns of the first example through the third example. By forming the above-mentioned resistance-film removal areas 133, the resistance-film removal areas 133 are hardly influenced by a potential supplied from the common electrode 134 near the opposite ends of each of the first side 171-1, the second side 171-2, the third side 171-3 and the fourth side 171-4 of the panel part 121. The resistance-film removal areas 133 tend to be influenced by a potential supplied from the common electrode 134 in the middle portion of each side. Accordingly, a distortion in the potential distribution near the opposite ends of each of the first side 171-1, the second side 171-2, the third side 171-3 and the fourth side 171-4 of the panel part 121 can be suppressed, which makes uniform the potential distribution in the transparent resistance-film 132. Thus, an accurate coordinate detection can be achieved. In the case where the resistance-film removal areas 133 and the common electrode 134 do not overlap with each other, an interval S between the resistance-film removal areas 133 and the common electrode 134 must be equal to or greater than 0 mm and equal to or smaller than 5 mm in order to obtain the above-mentioned effect.

Figure 9C:
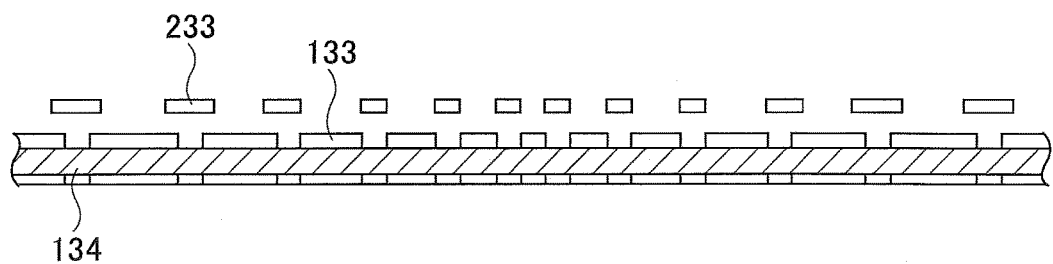
FIG. 9C is a plan view of a sixth example of the resistance-film removal areas and the common electrode.

FIG. 9C is a plan view of a sixth example of the resistance-film removal areas 133 and the common electrode 134. In FIG. 9C, another set of resistance-film removal areas 233 (second resistance-film removal areas) are formed on an inner side of the common electrode 14. That is, the sixth example is a combination of the first through third examples and the fifth example mentioned above. Accordingly, a distortion in the potential distribution near the opposite ends of each of the first side 171-1, the second side 171-2, the third side 171-3 and the fourth side 171-4 of the panel part 121 can be further suppressed, which makes uniform the potential distribution in the transparent resistance-film 132. Thus, a more accurate coordinate detection can be achieved. Although a single line of second resistance-film removal areas 233 are provided in FIG. 9C, a plurality of lines of second resistance-film removal areas 233 may be provided further on the inner side of the common electrode 134.

A description will be given below of a manufacturing process of the lower board 121. FIGS. 10A through 10F are illustrations for explaining a manufacturing process of the lower board 121.

Figure 10A:
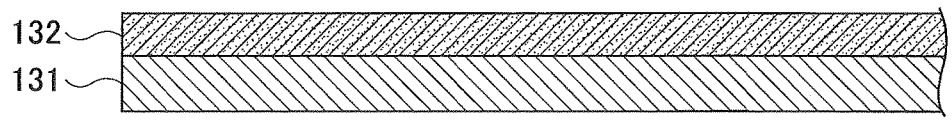
FIGS. 10A through 10F are illustrations for explaining a manufacturing process of a lower board illustrated in FIG. 2.

First, as illustrated in FIG. 10A, the transparent resistance-films 132 is formed on the glass substrate 131 by depositing a material such as ITO by sputtering or a vacuum vapor deposition.

Figure 10B:
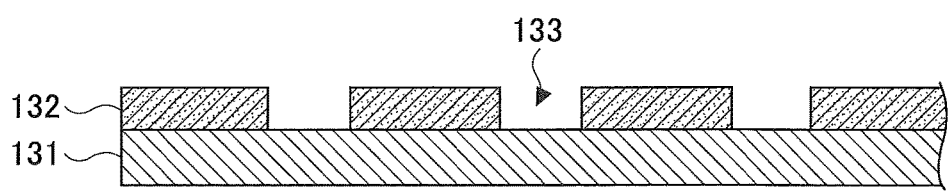
Figure 10C:
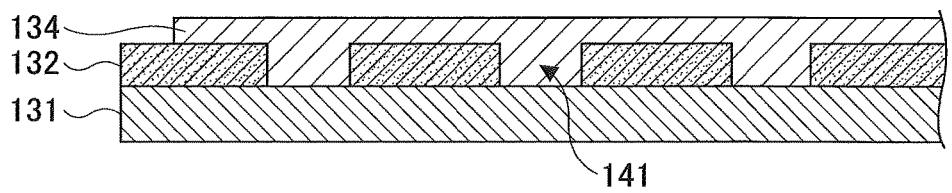

Then, as illustrated in FIG. 10B, the resistance-film removal areas 133 are formed in the transparent resistance-film 132. Specifically, an ultraviolet (UV) laser light or an infrared laser light is irradiated onto portions of the transparent resistance-film 132 where the transparent resistance-film 132 is to be removed in order to remove the transparent resistance-film 132 by abrasion or heat. The resistance-film removal areas 133 may be formed by removing the transparent resistance-film 132 by chemical etching after forming a resist pattern in an area other than the area corresponding to the resistance-film removal areas 133.

Then, as illustrated in FIG. 10O, the common electrode 134 is formed on the transparent resistance-film 132 using Ag—C. Specifically, a paste containing Ag—C is printed on the transparent resistance-film 132 by screen-printing and, thereafter, the paste is baked. Thereby, the potential supply parts 141 are formed on the transparent resistance-film 132 between the adjacent resistance-film removal areas 133.

Figure 10D:
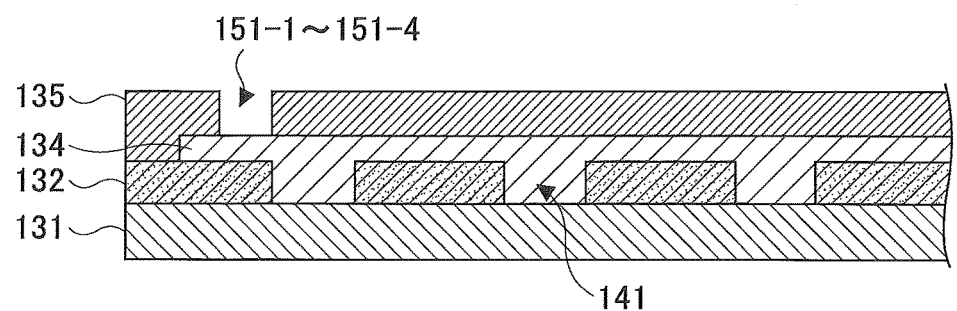

Then, as illustrated in FIG. 10D, the first insulation film 135 having the first through fourth penetrating holes 151-1 through 151-4 is formed. Specifically, an insulating paste is printed by pattern printing according to a screen printing method, and, thereafter, the insulating paste is baked.

Figure 10E:
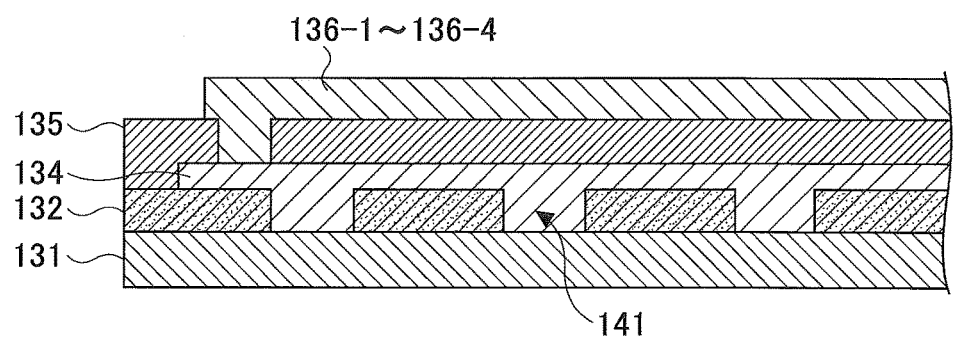

Then, as illustrated in FIG. 10E, the first through fourth wires 136-1 through 136-4, which are made of Ag, are formed on the first insulation film 135. Specifically, an electrically conductive paste is printed by pattern printing according to a screen printing method, and, thereafter, the electrically conductive paste is baked.

Figure 10F:
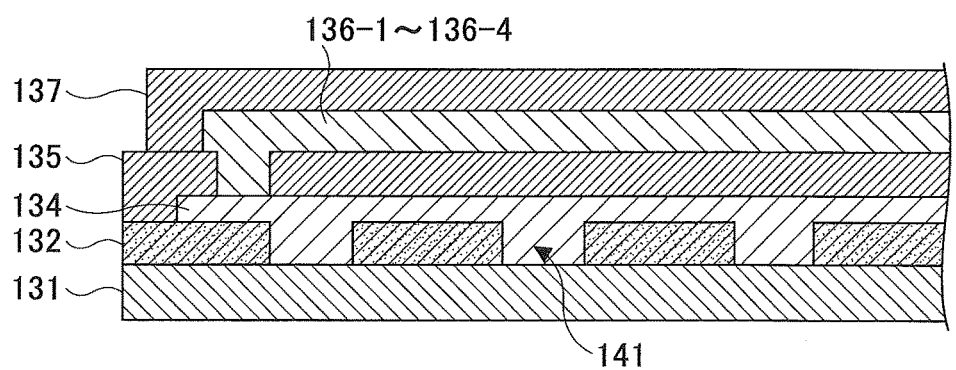

Then, as illustrated in FIG. 10F, the second insulation film 137 is formed. Specifically, an insulating paste is printed by pattern printing according to a screen printing method, and, thereafter, the insulating paste is baked.

The lower board 121 can be manufactured by performing the above-mentioned process.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A coordinate detection apparatus comprising:
a resistance-film formed on a substrate;
a plurality of resistance-film removal areas provided along outer sides of the substrate, each of the plurality of resistance-film removal areas is formed by removing a portion of the resistance-film;
a plurality of potential supply parts of the resistance film provided between two resistance-film removal areas from among the plurality of resistance-film removal areas; and
a plurality of common electrodes respectively arranged along the outer sides of the substrate, each of the plurality of common electrodes being formed over the plurality of resistance-film removal areas, the plurality of common electrodes being configured to contact the plurality of potential supply parts so as to apply a voltage to the resistance-film through the plurality of potential supply parts,
wherein the resistance-film removal areas are configured and arranged so that a uniform potential distribution is generated in the resistance-film when the voltage is applied to the resistance film, and
wherein each of the plurality of potential supply parts is formed so that a contact area between the common electrode and the resistance-film per unit length is gradually reduced from a middle portion of each of the outer sides of the substrate toward each end of the outer sides.

2. The coordinate detection apparatus as claimed in claim 1, further comprising:
a plurality of second resistance-film removal areas formed along the plurality of common electrodes within an area surrounded by the plurality of common electrodes.

3. The coordinate detection apparatus as claimed in claim 1,
wherein at least one of pitches of the resistance-film removal areas and intervals between adjacent resistance-film removal areas are equal to each other, respectively.

4. The coordinate detection apparatus as claimed in claim 1, wherein each of the resistance-film removal areas has the same shape.

5. A coordinate detection apparatus comprising:

a resistance-film formed on a substrate;

a plurality of resistance-film removal areas provided along outer sides of the substrate, each of the plurality of resistance-film removal areas is formed by removing a portion of the resistance-film;

a plurality of potential supply parts of the resistance film provided between two resistance-film removal areas from among the plurality of resistance-film removal areas; and a plurality of common electrodes respectively arranged along the outer sides of the substrate, each of the plurality of common electrodes being respectively formed over the plurality of resistance-film removal areas, the plurality of common electrodes being configured to contact the plurality of potential supply parts so as to apply a voltage to the resistance-film through the plurality of potential supply parts, wherein the resistance-film removal areas are configured and arranged so that a uniform potential distribution is generated in the resistance-film when the voltage is applied to the resistance film, and wherein each of the plurality of potential supply parts is formed so that a number of the plurality of potential supply parts per unit length is gradually reduced from a middle portion of each of the outer sides of the substrate toward each end of the outer sides.

* * * * *